Figure 1:
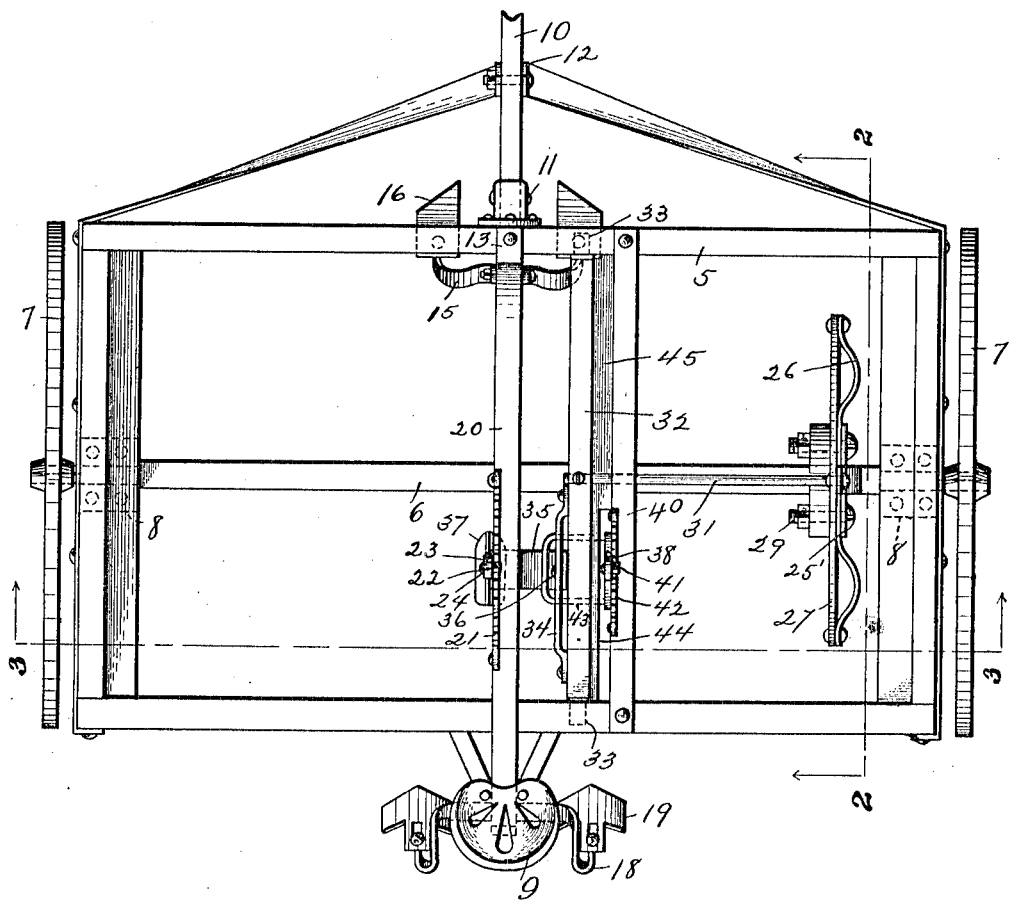

J. BRAUN.
COTTON BLOCKING MACHINE.
APPLICATION FILED SEPT. 22, 1913.

1,090,193.

Patented Mar. 17, 1914.
2 SHEETS—SHEET 1.

Witnesses
Jno. R. Woodworth
Ann M. Murray

Inventor
Joseph Braun,

By Shepherd & Campbell
Attorneys

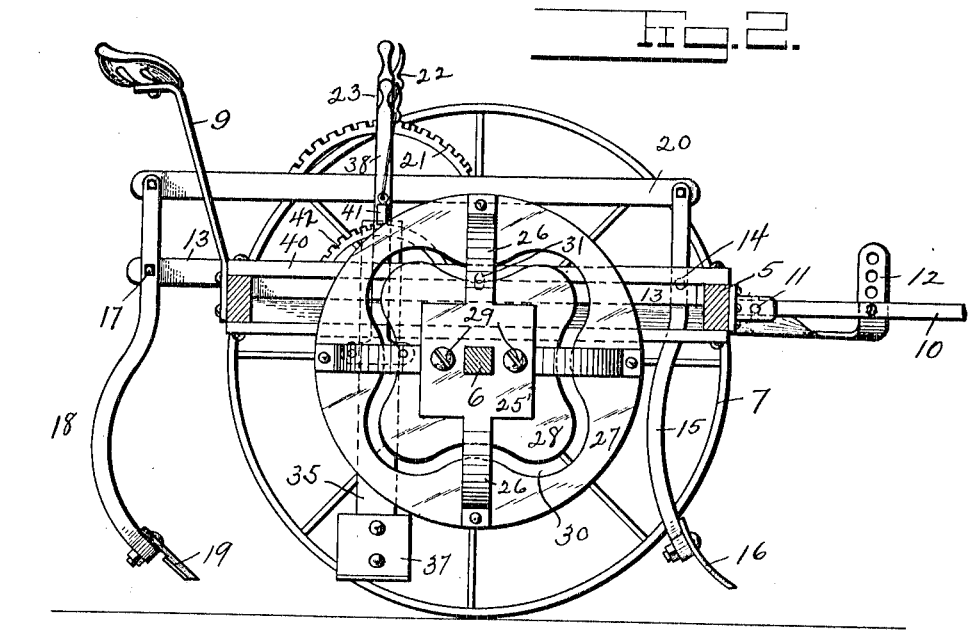
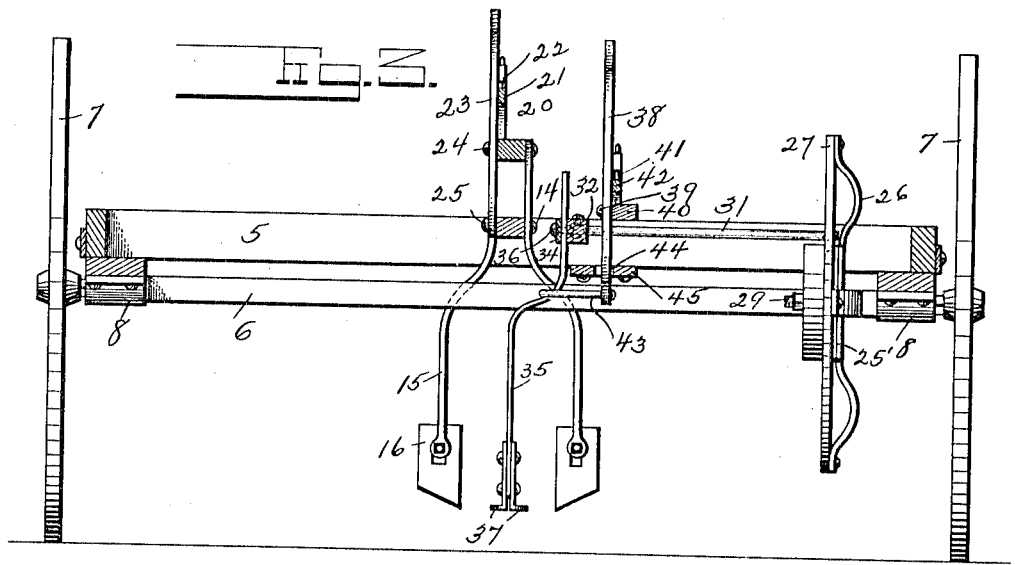

UNITED STATES PATENT OFFICE.

JOSEPH BRAUN, OF NEW DECATUR, ALABAMA.

COTTON-BLOCKING MACHINE.

1,090,193.

Specification of Letters Patent. Patented Mar. 17, 1914.

Application filed September 22, 1913. Serial No. 791,028.

*To all whom it may concern:*

Be it known that I, JOSEPH BRAUN, a citizen of the United States of America, residing at New Decatur, in the county of Morgan and State of Alabama, have invented certain new and useful Improvements in Cotton-Blocking Machines, of which the following is a specification.

This invention relates to cotton blocking machines and has for its object the provision of an improved device of this character adapted to cultivate the cotton both longitudinally and transversely of the rows during the passage of the machine lengthwise of the rows, as well as to cut away the weeds from the sides of the rows.

In accomplishing the foregoing objects, weed cutting and cultivating hoes are adjustably mounted with relation to ground wheels in such manner that their elevation and inclination may be varied at will. In addition, there is provided a transversely oscillating blade adapted to chop the cotton transversely of the line of travel of the machine. In some of the machines of this character heretofore devised, transversely reciprocatory choppers have been employed which were incapable of any adjustment longitudinally of the rows so that if the plants did not happen to be all the same distance apart, there was danger that the plants would be destroyed by this transversely reciprocating blade. To guard against such possibility, I have rendered my transversely reciprocating blade longitudinally adjustable with relation to the line of travel of the machine so that minor variations in the spacing of the cotton plants may be compensated for. In like manner if the machine should lose ground by the ground wheels rolling over clods or the like, this longitudinal adjustment will compensate for the same.

Further objects and advantages of the invention will be set forth in the detailed description which now follows:

In the accompanying drawing, Figure 1 is a plan view of a cotton blocking machine constructed in accordance with the invention, Fig. 2 is a longitudinal sectional view therethrough upon line 2—2 of Fig. 1, and Fig. 3 is a transverse sectional view therethrough upon line 3—3 of Fig. 1.

Like numerals designate corresponding parts in all of the figures of the drawing.

Referring to the drawing, 5 designates a rectangular frame mounted upon a rotative axle 6 carrying ground wheels 7, said axle having its bearing in boxes 8. A driver's seat 9 is mounted upon the rectangular frame 5 and a tongue 10 or other driving element provides means for attaching draft animals to the machine. The tongue 10 is pivoted to the frame at 11 and passes between the upstanding ears 12 of a clevis by means of which the angle of the frame may be adjusted.

A bar 13 fastened rigidly to the frame and extending longitudinally thereof has pivoted thereto at 14 or at its forward end, a pair of arms 15 which support weed cutting blades 16. The bar 13 has pivoted thereto at its rear end as indicated at 17, a pair of arms 18 carrying cultivating blades 19. For adjusting the elevation and inclination of these blades 16 and 19, the other ends of the arms 15 and 18 are connected by a bar 20. This bar carries an arcuate rack 21 with which a latch 22 of a lever 23 engages. This lever is pivoted at 24 to the bar 20 and at 25 to bar 13, and since bar 13 is a fixed bar, it follows that the swinging of this lever back and forth will move the bar 20 back and forth, and will adjust the arms 15 and 18 to varying angles in a manner that will be readily understood.

By referring to Fig. 2, it will be seen that the shaft 6 is angular in cross section and that this shaft passes through a plate 25 having a plurality of radial arms 26 extending therefrom which arms are bowed and at their outer ends are fixed to the upper portion 27 of a cam plate. The inner portion 28 of this cam plate is secured to plate 25 by screws or like fastening devices 29, by virtue of which construction the outer and inner portions of the cam plate are tied together, but a continuous cam groove 30 is provided in which one end of a rod projects transversely of the machine from a rock bar 32, the ends of said rock bar being pivoted at 33, (see Fig. 1) in the frame 5.

The rock bar 32 carries a keeper 34 through which a bar 35 passes. Bar 35 is pivoted at 36 so that it is capable of a back and forth swinging movement longitudinally of the machine while at the same time, the oscillation or rocking of bar 32 imparts a transverse reciprocation to said bar 35. This bar 35 at its lower end carries cultivator shoes 37. For adjusting the bar 35 and consequently the cultivator shoes carried thereby, longitudinally of the machine, a hand lever 38 is pivoted at 39 to a fixed bar 40 and this lever is provided with a latch 41 coacting with an arcuate rack 42. At its lower end lever 38 carries a yoke 43 which embraces bar 35. It is apparent therefore that the shifting of lever 38 will adjust the position of the shoes 37 longitudinally of the line of travel of the machine. To further aid in guiding and limiting the movement of the lever 38, the lower end of this lever is passed through a slot 44 formed in a longitudinally extending bar 45.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. In a device of the character described, the combination with a supporting frame, of longitudinally acting cultivators carried thereby, a horizontally disposed oscillatory bar mounted in said frame and extending longitudinally of the line of travel thereof, ground wheels, means for imparting movement to said bar from said ground wheels, a transversely acting cultivator having a shank pivoted to said oscillatory bar to swing longitudinally thereto, the oscillatory movement of said bar imparting transverse movement to said shank and cultivator, and manually operable means for swinging said shank upon its pivot to shift said transversely acting cultivator backward or forward longitudinally of the line of travel of the machine.

2. In a device of the character described, the combination with a frame, of ground wheels upon which said frame is mounted, a cam driven from said ground wheels, a horizontally disposed rock bar, means for rocking said bar from said cam, a cultivator comprising a blade and a shank, said shank being pivoted upon said rock bar to swing longitudinally thereto, a manually operable member, and a yoke actuated by said manually operable member and embracing said shank and serving to shift said shank upon its pivot while permitting lateral motion of said shank as said bar is rocked.

3. In a cotton blocking machine, the combination with ground wheels, of a cam, means for driving said cam from said ground wheels, a longitudinally extending rock bar, a rod extending transversely from said bar and engaging said cam, and a transversely acting cultivator pivoted to said bar to swing longitudinally thereof.

4. In a cotton blocking machine, the combination with ground wheels, of a cam, means for driving said cam from said ground wheels, a longitudinally extending rock bar, a rod extending transversely from said bar and engaging said cam, a transversely acting cultivator pivoted to said bar to swing longitudinally thereof, and means for swinging said cultivator upon its pivot.

5. In a cotton blocking machine, the combination with ground wheels, of a cam, means for driving said cam from said ground wheels, a longitudinally extending rock bar, a rod extending transversely from said bar and engaging said cam, a transversely acting cultivator pivoted to said bar to swing longitudinally thereto, a pivoted hand lever, and a yoke carried by said hand lever and embracing said cultivator.

In testimony whereof I affix my signature in presence of two witnesses.

JOSEPH BRAUN.

Witnesses:
W. R. SMITH,
H. C. McCORD.

---

Copies of this patent may be obtained for five cents each, by addressing the "Commissioner of Patents, Washington, D. C."